Figure 1:
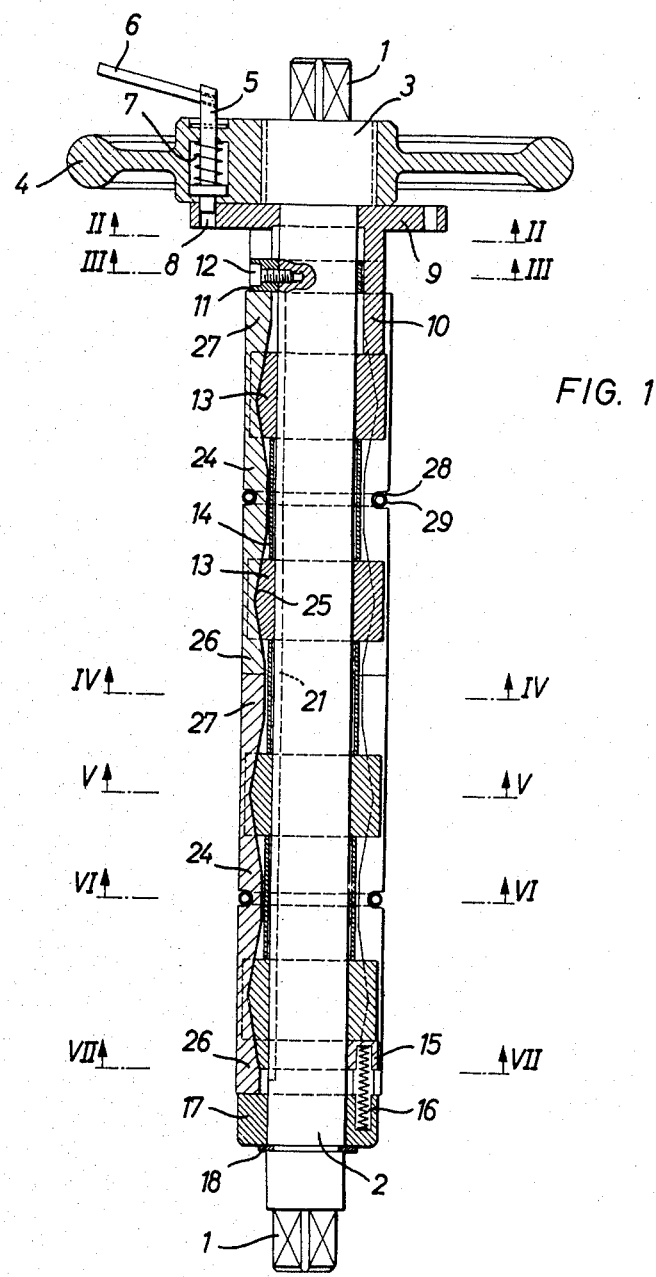

Aug. 17, 1965 R. WALDHERR ETAL 3,201,058
WINDING ROLL OR MANDREL
Filed Aug. 1, 1962 4 Sheets-Sheet 1

Inventors
RUDOLF WALDHERR
LAURENCE WEILAND

By Toulmin & Toulmin
Attorneys

Aug. 17, 1965    R. WALDHERR ETAL    3,201,058
WINDING ROLL OR MANDREL
Filed Aug. 1, 1962    4 Sheets-Sheet 2
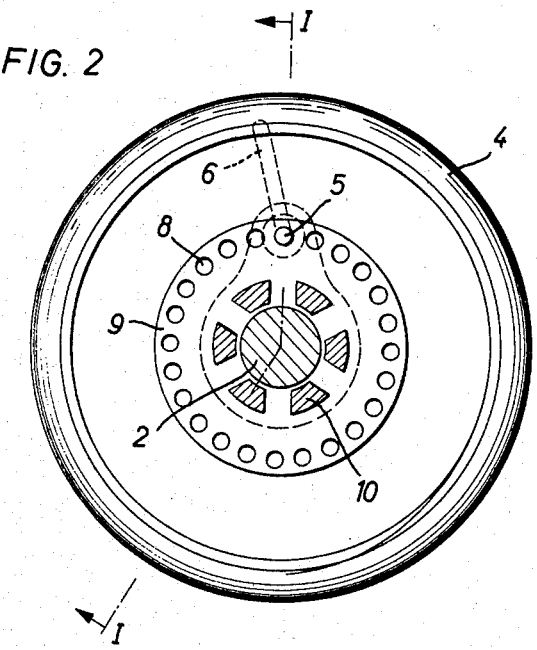
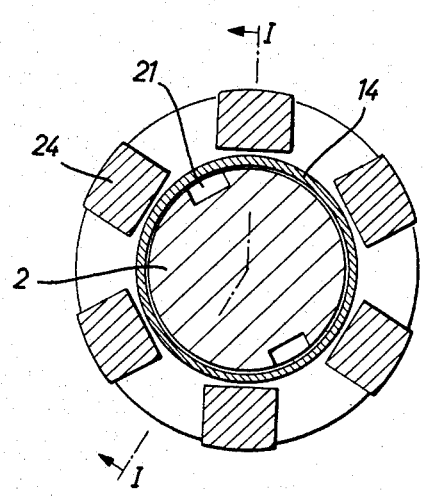
Inventors
RUDOLF WALDHERR
LAURENCE WEILAND
By *Toulmin & Toulmin*
Attorneys Aug. 17, 1965   R. WALDHERR ETAL   3,201,058
WINDING ROLL OR MANDREL
Filed Aug. 1, 1962   4 Sheets-Sheet 3

Inventors
RUDOLF WALDHERR
LAURENCE WEILAND
By Toulmin & Toulmin
Attorneys

Aug. 17, 1965   R. WALDHERR ETAL   3,201,058
WINDING ROLL OR MANDREL

Filed Aug. 1, 1962   4 Sheets-Sheet 4

Inventors
RUDOLF WALDHERR
LAURENCE WEILAND

By Toulmin & Toulmin
Attorneys

United States Patent Office 3,201,058
Patented Aug. 17, 1965

3,201,058
WINDING ROLL OR MANDREL
Rudolf Waldherr, Erkrath, near Dusseldorf, and Laurence Weiland, Mettmann, near Dusseldorf, Germany, assignors to Hugo Stinnes Personlich Gesellschaft mit beschränkter Haftung, Mulheim (Ruhr), Germany
Filed Aug. 1, 1962, Ser. No. 214,470
Claims priority, application Germany, Aug. 5, 1961, R 30,884
2 Claims. (Cl. 242—72.1)

The present invention relates to a winding roll or mandrel, more particularly, to a winding roll the outer surface of which may be varied to adjust the tension on sheet material wound on the roll.

Winding rolls have been constructed comprising a tubular roll mounted upon a shaft with tapered sleeves being provided on both ends of the shaft. At least one of the tapered sleeves is axially movable on the shaft and can be secured in various adjusted positions in order to obtain a friction driving connection between the shaft and the roll. This arrangement was not particularly suitable since the engaging and disengaging of the roll onto the shaft involved rather complicated structure, was time consuming and required considerable efforts on the parts of the operators. In addition the winding rolls were susceptible to damage caused by this engaging and disengaging and as a result the rolls were rendered unserviceable after an unduly short time.

It is therefore the principal object of the present invention to provide a novel and improved winding roll.

The improved winding roll of the present invention essentially comprises a shaft upon which are mounted a number of sleeves which are axially movable on the shaft. Each of the sleeves has axially extending grooves in the outer surfaces with the bottom faces of these grooves being tapered. Axially extending bars are positioned in the grooves of the sleeves and are also tapered so as to be radially movable within these grooves. Metallic cylinders are positioned between the sleeves in order to axially space the sleeves along the shaft. A spring system is provided on one end of the shaft to limit the axial movement of the sleeves and the other end of the shaft is provided with a structure for axially moving the sleeves against the spring system and for clamping the sleeves into the adjusted position. Collars are provided on the ends of the shaft to limit the axial movement of the bars and a resilient member encircles the bars in order to limit the outward radial movement of them.

Figure 3:
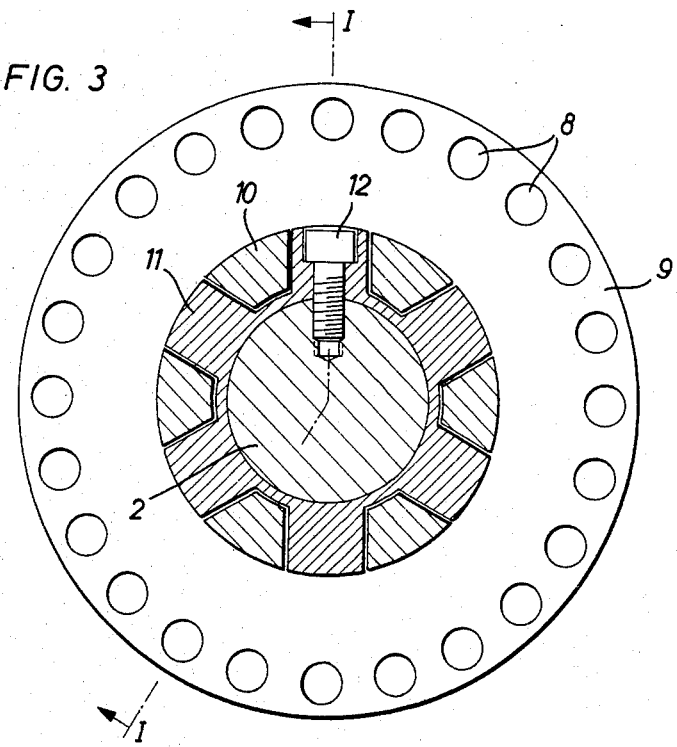
Figure 6:
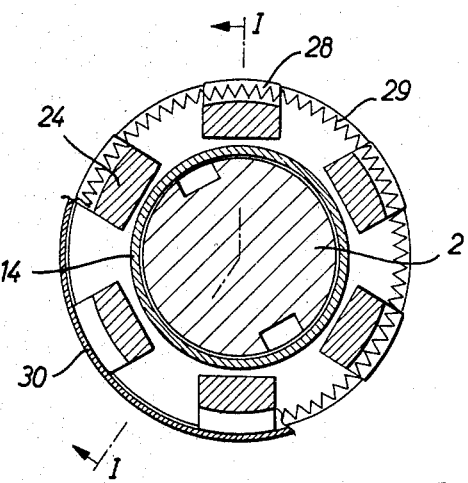
Figure 5:
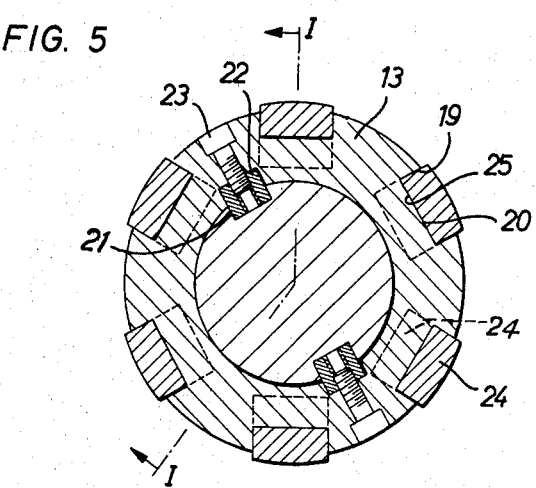
Figure 7:
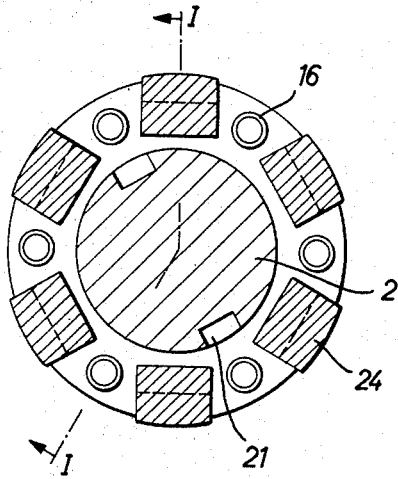

Other objects and advantages of the present invention will be apparent upon reference to the accompanying description when taken in conjunction with the following drawings wherein;

FIGURE 1 is a longitudinal sectional view through a winding roll of the present invention and taken along the line I—I of FIGURES 2 to 7; and FIGURES 2 to 7 are transverse sectional views of the winding roll of FIGURE 1 taken along the lines II—II through VII—VII, respectively, with FIGURE 3 shown in a somewhat enlarged scale, and with FIG. 6 showing a modification on one side thereof.

With respect to the drawings wherein like reference symbols indicate the same parts throughout the various views a specific embodiment and several modifications of the present invention will be described in detail.

With particular reference to FIGURE 1, there is illustrated a shaft 2 which is cylindrical and has squared driving ends 1 on both ends thereof to provide a driving connection for the roll. On one end of the shaft 2 there is an enlarged diameter portion 3 having threads thereon upon which is screwed a hand wheel 4. Mounted in the hand wheel 4 is a detent pin 5 having a handle 6 and urged to the left or locking position by a helical spring 7. The detent pin is engageable with one of a plurality of holes 8 formed in a flange 9 which is slidably mounted on the shaft 2 and can be moved thereon by the screwing of the hand wheel 4 to the left as shown in FIGURE 1.

The end of the flanged sleeve 9 has a plurality of axially extending fingers 10 which are axially guided in a grooved member 11 fixedly mounted on the shaft 2 by the screw 12. With this arrangement the flanged sleeve 9 is not rotatable with respect to the shaft 2.

The inner end of the axial fingers 10 engage the sleeves 13 a number of which are axially spaced along the shaft 2 by thin-walled cylindrical spacers 14 as may be seen in FIGURE 4. The extreme left hand sleeve bears against an axially movable star-shaped collar member 15 which, in turn, bears against a plurality of circumferentially spaced helical springs 16. The springs 16 have their other end supported against a disk 17 which is held in position by a collar ring 18 positioned in an annular groove on the shaft 2.

Each sleeve 13 is provided with a plurality of axially extending guide grooves 19 with the bottom surfaces 20 of these grooves being inclined so as to form wedges. This relationship may be seen in FIGURE 5. The inclined surfaces 20 are positioned upon the periphery of a circle. The shaft 2 is further provided with a plurality of longitudinally extending slots 21 which receive axial guides 22 secured to the sleeves 13 by screws 23. This guiding arrangement permits an axial displacement of the sleeves 13 but prevents any rotation of these sleeves with respect to the shaft 2.

Axial bars 24 are positioned in the axially extending grooves 19 and have inclined surfaces 25 which cooperate with the inclined surfaces 20 of the grooves. The outer surfaces of the bars 24 define a cylinder as may be seen in FIGURE 5. The ends 26 and 27 of the bars 24 are restrained against axial movement by the supporting disk 17 and the slotted member 11, respectively. As a result, the bars 24 are free to move radially with respect to the shaft 2.

An annular groove 28 is milled into the outer surfaces of the bars 24 and receives a circular helical spring 29 which urges the bars 24 against the inclined surfaces 20 of the axial grooves 19.

As can be seen in FIGURE 6 the winding roll can be enclosed by a rubber sleeve 30 instead of the springs 29. Such a tubular sleeve has the advantage that the friction between the bars and the roll is increased and a sleeve protects the roll against the entrance of dust or moisture. In addition, this rubber sleeve retains lubricants within the winding roll.

In the functioning of this winding roll, the roll is mounted in its unstressed condition. The detent pin 5 is withdrawn from the hole 8 and rotated by 90° so as to be locked into the open position. The hand wheel 4 is then screwed upon the enlarged portion 3 and moved to the left so as to urge the flanged sleeve 9 and its guiding fingers 10 also to the left against the sleeves 13. The sleeves 13 are thus all urged to the left and the springs 16 are compressed. The bars 24 are thus urged radially outwardly by the camming action of the inclined surfaces 20 and 25. Thus, the outer surface of the winding roll as defined by the outer surfaces of the bar is clamped in a centric position with respect to the shaft 2. This clamping is uniform over the entire length of the shaft and requires only a small quantity of mechanical power because of the relatively slight inclinations of the inclined surfaces 20 and 25.

When the bars 24 are clamped in their desired position the detent pin 5 is then rotated back to its angle of 90° so it can enter one of the holes 8 which is positioned in front of it. This then locks the hand wheel 4 in position and as a result the bars 24 are also locked in their clamped position.

The unclamping of the bars is accomplished merely by turning the hand wheel 4 in such a direction that it is screwed to the right. The action of the springs 16 and 29 will return the axial bars 24 to their original unclamped position.

Thus, it can be seen that the present invention provides a winding roll, the outer diameter of which can be uniformly adjusted according to the conditions of the sheet material such as paper or plastics wound on the roll.

It will be understood that this invention is susceptible to further modification and, accordingly, it is desired to comprehend such modifications within this invention as may fall within the scope of the appended claims.

What is claimed is:

1. A winding mandrel comprising a shaft, a nut threaded on one end for longitudinal movement and an abutment disk fixed on the other end of the shaft, a ring-shaped flange slidably and non-rotatably mounted on said shaft and abutting said nut, said flange having integral fingers projecting therefrom and lying along said shaft, spaced sleeves slidably mounted on said shaft; longitudinally extending radially expandable bars mounted on said sleeves and resilient means holding said bars against said sleeves; cylindrical spacers between said sleeves and holding them in spaced relation, the outer surfaces of said sleeves and the inner surfaces of said bars having slidably contacting frusto-conical surfaces, said bars being held against longitudinal movement, said nut, fingers and cylindrical spacers operating to slide said sleeves axially along said shaft to cam said bars radially outwardly.

2. The invention as set forth in claim 1, said resilient means holding said bars against said sleeve comprising encircling springs mounted in outwardly facing transverse grooves in said bars.

References Cited by the Examiner
UNITED STATES PATENTS

| | | | |
|---|---|---|---|
| 459,265 | 9/91 | Barton | 242—72.1 |
| 528,150 | 10/94 | Coram | 242—72.1 |
| 1,171,417 | 2/16 | Esenko | 242—72.1 |
| 1,710,902 | 4/29 | Stackowski | 242—72.1 |
| 2,097,287 | 10/37 | McKenna | 242—72.1 |
| 2,365,980 | 12/44 | Thomas | 242—72.1 X |
| 2,403,147 | 7/46 | Westergaard | 242—72.1 X |
| 2,733,874 | 2/56 | Petersen et al. | 242—72.1 |

MERVIN STEIN, *Primary Examiner.*

RUSSELL C. MADER, *Examiner.*